(12) United States Patent
Vonk et al.

(10) Patent No.: US 11,891,534 B2
(45) Date of Patent: Feb. 6, 2024

(54) TREATMENT OF CONVERSION-COATED METAL SUBSTRATES WITH PREFORMED REACTION PRODUCTS OF CATECHOL COMPOUNDS AND FUNCTIONALIZED CO-REACTANT COMPOUNDS

(71) Applicant: Henkel AG & Co. KGaA, Duesseldorf (DE)

(72) Inventors: Donald Robb Vonk, Clinton Township, MI (US); Louis Patrick Rector, Rochester Hills, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 517 days.

(21) Appl. No.: 16/437,113

(22) Filed: Jun. 11, 2019

(65) Prior Publication Data

US 2019/0292402 A1   Sep. 26, 2019

Related U.S. Application Data

(63) Continuation of application No. PCT/US2017/068138, filed on Dec. 22, 2017.

(60) Provisional application No. 62/437,696, filed on Dec. 22, 2016.

(51) Int. Cl.
| | | |
|---|---|---|
| *C09D 179/02* | (2006.01) | |
| *B32B 15/04* | (2006.01) | |
| *B32B 15/08* | (2006.01) | |
| *C23C 22/05* | (2006.01) | |
| *C23C 22/06* | (2006.01) | |
| *C23C 22/50* | (2006.01) | |
| *C23C 22/56* | (2006.01) | |
| *C23C 22/60* | (2006.01) | |
| *C23C 22/73* | (2006.01) | |
| *C23C 22/76* | (2006.01) | |
| *C23C 22/82* | (2006.01) | |
| *C23F 11/04* | (2006.01) | |
| *C08K 5/105* | (2006.01) | |
| *C09D 133/00* | (2006.01) | |
| *C09D 5/00* | (2006.01) | |
| *C09D 7/63* | (2018.01) | |
| *C23C 22/34* | (2006.01) | |
| *C23C 22/48* | (2006.01) | |
| *C23C 22/53* | (2006.01) | |
| *C23C 22/78* | (2006.01) | |
| *C23C 22/83* | (2006.01) | |
| *C23F 11/173* | (2006.01) | |
| *C08G 73/02* | (2006.01) | |
| *B05D 7/00* | (2006.01) | |
| *C23C 22/07* | (2006.01) | |

(52) U.S. Cl.
CPC ............ *C09D 179/02* (2013.01); *B32B 15/04* (2013.01); *B32B 15/08* (2013.01); *C23C 22/05* (2013.01); *C23C 22/06* (2013.01); *C23C 22/07* (2013.01); *C23C 22/50* (2013.01); *C23C 22/56* (2013.01); *C23C 22/60* (2013.01); *C23C 22/73* (2013.01); *C23C 22/82* (2013.01); *C23F 11/04* (2013.01)

(58) Field of Classification Search
None
See application file for complete search history.

(56) References Cited

U.S. PATENT DOCUMENTS

| | | |
|---|---|---|
| 5,015,507 A | 5/1991 | DesLauriers et al. |
| 5,266,410 A | 11/1993 | Lindert et al. |
| 5,891,952 A | 4/1999 | McCormick et al. |
| 6,027,578 A | 2/2000 | Marzano |
| 6,132,808 A | 10/2000 | Brown et al. |
| 6,607,610 B1 | 8/2003 | Carey et al. |
| 7,063,735 B2 | 6/2006 | Fristad et al. |
| 7,390,847 B2 * | 6/2008 | Gonzalez ............... C23C 22/34 524/406 |
| 7,976,692 B2 | 7/2011 | Hu et al. |
| 8,287,662 B2 | 10/2012 | Inbe et al. |
| 8,999,452 B2 | 4/2015 | Messersmith et al. |
| 9,028,667 B2 | 5/2015 | Inbe et al. |
| 9,394,621 B2 | 7/2016 | Inbe et al. |
| 2004/0079647 A1 | 4/2004 | Warburton et al. |
| 2004/0137246 A1 | 7/2004 | Fristad et al. |
| 2005/0121114 A1 | 6/2005 | Fernandez et al. |
| 2005/0126427 A1 * | 6/2005 | Gonzalez ............. C09D 161/14 427/435 |
| 2006/0172064 A1 | 8/2006 | Kolberg et al. |
| 2008/0171012 A1 | 7/2008 | Messersmith et al. |
| 2008/0302448 A1 | 12/2008 | Frey et al. |

FOREIGN PATENT DOCUMENTS

| | | |
|---|---|---|
| CN | 1052317 A | 6/1991 |
| CN | 101137767 A | 3/2008 |
| CN | 102634792 A | 8/2012 |

(Continued)

OTHER PUBLICATIONS

BASF, "Lupasol types," pp. 1-10. (2010). (Year: 2010).*

(Continued)

*Primary Examiner* — Randy P Gulakowski
*Assistant Examiner* — Ha S Nguyen
(74) *Attorney, Agent, or Firm* — Mary K. Cameron

(57) ABSTRACT

The corrosion resistance of conversion-coated metal substrate surfaces is further enhanced by treating such surfaces with aqueous mixtures of preformed reaction products obtained by reacting catechol compounds, such as dopamine or a dopamine salt, and functionalized co-reactant compounds, such as a polyethyleneimine.

20 Claims, No Drawings

(56) References Cited

FOREIGN PATENT DOCUMENTS

| | | | |
|---|---|---|---|
| CN | 102677032 | A | 9/2012 |
| CN | 103435829 | A | 12/2013 |
| CN | 103435830 | A | 12/2013 |
| CN | 103525154 | A | 1/2014 |
| CN | 103739867 | A | 4/2014 |
| CN | 103757619 | A | 4/2014 |
| CN | 102787312 | B | 5/2014 |
| CN | 103789759 | A | 5/2014 |
| CN | 104141124 | A | 11/2014 |
| CN | 104194026 | A | 12/2014 |
| CN | 104211979 | A | 12/2014 |
| CN | 104357814 | A | 2/2015 |
| CN | 104562002 | A | 4/2015 |
| CN | 103183989 | B | 6/2015 |
| CN | 104746073 | A | 7/2015 |
| CN | 104846354 | A | 8/2015 |
| CN | 105088212 | A | 11/2015 |
| CN | 105111495 | A | 12/2015 |
| CN | 103160824 | B | 1/2016 |
| DE | 3835400 | A1 | 3/1990 |
| GB | 1129196 | A | 10/1968 |
| JP | S5394583 | A | 8/1978 |
| JP | H0598199 | A | 4/1993 |
| JP | 2001172558 | A | 6/2001 |
| JP | 2001181860 | A | 7/2001 |
| JP | 2005524767 | A | 8/2005 |
| JP | 2007297709 | A | 11/2007 |
| JP | 2012072440 | A | 4/2012 |
| JP | 2014070278 | A | 4/2014 |
| JP | 2016513545 | A | 5/2016 |
| KR | 20120082156 | A | 7/2012 |
| NL | 287499 | A | 2/1965 |
| WO | 03008376 | A2 | 1/2003 |
| WO | 2007117044 | A1 | 10/2007 |
| WO | 2013185131 | A1 | 12/2013 |

OTHER PUBLICATIONS

Supplementary EP Search Report for EP 17885001 dated Jul. 10, 2020.
Supplementary EP Search Report for EP 17882552 dated Jul. 10, 2020.
Supplementary EP Search Report for EP 17885384 dated Jul. 10, 2020.
Saad Moulay: "Dopa/Catechol-Tethered Polymers: Bioadhesives and Biomimetic Adhesive Materials", Polymer Reviews, vol. 54, Issue 3, May 5, 2014, pp. 436-513, "p. 495, lines 7-20; figure 72". Cited in Supplementary EP Search Report for EP 17882552 dated Jul. 10, 2020.
International Search Report for PCT/US2017/068127 dated Apr. 26, 2018.
International Search Report for PCT/US2017/068134 dated May 17, 2018.
International Search Report for PCT/US2017/068138 dated May 17, 2018.
Wu et al, "Low-cost mussel inspired poly(catechol/polyamine) coating with superior anti-corrosion capability on copper", Journal of Colloid and Interface Science, 463 (2016), pp. 214-221.
Ghelichkhah et al, "L-cysteine/polydopamine nanoparticle-coatings for copper corrosion protection", Corrosion Science, 91 (2015), pp. 129-139.
Zhao et al, "Mussel-Inspired One-Pot Synthesis of a Fluorescent and Water-Soluble Polydopamine-Polyethyleneimine Copolymer", Macromolecular Rapid Communications, 2015, 36, pp. 909-915, DOI: 10.1002/marc.201500021, Copyright Wiley-VCH Verlag GmbH & Co. KGaA, Weinheim.
Jiang, et al, "Surface Characteristics of a Self-Polymerized Dopamine Coating Deposited on Hydrophobic Polymer Films", American Chemical Society Copyright 2011, dx.doi.org/1021/la202877k, Langmuir 2011, 27, pp. 14180-14187.
Faure, Emily, et al, "Catechols as Versatile Platforms in Polymer Chemistry", Progress in Polymer Science, 38.1 (2013); 236-270, Copyright 2012 Elsevier Ltd.
Roberts, Donald E., "Heats of Polymerization. A Summary of Published Values and Their Relation to Structure", Journal of Research of the National Bureau of Standards, Research Paper RP2703, vol. 44 (1950), 221-232. Year 1950.
Odian, George, "Principles of Polymerization", Fourth Edition, John Wiley & Sons, Inc. Copyright 2004.
Wang et al ("Mussel inspired modification of polypropylene separators by catechol/polyamine for Li-ion batteries." ACS Applied Materials & Interfaces 6.8 (2014): pp. 5602-5608, Year 2014—Cited in related co-pending U.S. Appl. No. 16/437,072.
Smith & Van Ness, Introduction to Chemical Engineering Thermodynamics, Fourth Edition, McGraw-Hill, Inc. p. 517 (1987)—Cited in related co-pending U.S. Appl. No. 16/437,072.

* cited by examiner

TREATMENT OF CONVERSION-COATED METAL SUBSTRATES WITH PREFORMED REACTION PRODUCTS OF CATECHOL COMPOUNDS AND FUNCTIONALIZED CO-REACTANT COMPOUNDS

CROSS-REFERENCE TO RELATED APPLICATION

This application is a continuation of PCT/US2017/068138, filed Dec. 22, 2017, which claims priority to U.S. Provisional Application No. 62/437,696, filed Dec. 22, 2016, the disclosure of which is incorporated herein by reference in its entirety for all purposes.

FIELD OF THE INVENTION

The invention relates to methods for improving the corrosion resistance of a conversion-coated metal substrate.

BACKGROUND OF THE INVENTION

Various types of conversion coatings are currently applied to the surfaces of metal substrates for the purpose of reducing the tendency of such metal substrate surfaces to corrode when exposed to environmental conditions such as moisture, corrosive substances (e.g., salt) and molecular oxygen. Conversion coatings are understood in the art to be a type of metal pretreatment formed by contacting a metallic surface with a metal pretreatment composition, i.e., a conversion coating composition, which modifies the metallic surface and forms a conversion coating thereon. Although significant advances in formulating such protective conversion coatings have been made, further improvements in the corrosion resistance of metal conversion coatings would still be desirable, particularly in automotive and white goods applications.

Recently, there has been interest in utilizing polydopamine as a coating on various types of substrate surfaces, for the purpose of modifying or improving certain surface characteristics which are believed to be attributable to the catechol groups present in the polydopamine. Polydopamine itself has low solubility in water and thus in situ polymerization of dopamine has been attempted. See, for example, U.S. Pat. No. 8,999,452 to Messersmith et al. However, the polymerization of dopamine onto a substrate is a slow process (e.g., 8 hours or more under ambient conditions), making it impractical to use such an approach in a high speed manufacturing operation. Consequently, the development of alternative ways of placing catechol group-containing coatings onto substrate surfaces would be of commercial interest.

SUMMARY OF THE INVENTION

According to one aspect of the invention ("Aspect 1"), a method is provided which comprises contacting a surface of a conversion-coated metal substrate with an aqueous mixture comprised of at least one preformed reaction product of at least one catechol compound and at least one co-reactant compound comprised of one or more functional groups reactive with the at least one catechol compound (hereinafter sometimes referred to as "preformed catechol compound/co-reactant compound reaction product(s)") to provide a sealed conversion-coated metal substrate. Such aqueous mixtures are at times also referred to herein as "sealer solutions," although the aqueous mixture may be in the form of a true solution or a dispersion. Preferably, the aqueous mixture is storage-stable. As used herein, the term "preformed" when referring to the reaction product means that the reaction product has been formed in advance of contacting an aqueous mixture comprised of the reaction product with a surface of a conversion-coated metal substrate, e.g., at least 5, 30 or 60 minutes in advance of such contacting. Such preformed reaction products thus are to be contrasted with reaction products formed in situ by combining catechol compound and co-reactant compound in water in the presence of a conversion-coated metal substrate whereby the reaction product essentially simultaneously forms and deposits on the surface of the conversion-coated metal substrate. Thus, the present invention may comprise reacting at least one catechol compound and at least one co-reactant compound comprised of one or more functional groups reactive with the at least one catechol compound to obtain at least one preformed reaction product, storing the at least one preformed reaction product for a period of time (e.g., at least 30 minutes, at least 1 hour, at least 12 hours, at least 1 day, at least 1 week, or at least 1 month), using the preformed reaction product after being stored for a period of time to prepare a working bath, and contacting the working bath with a surface of a conversion-coated metal substrate to provide a sealed conversion-coated metal substrate.

Further illustrative aspects of the present invention may be summarized as follows:

Aspect 2: The method of Aspect 1, wherein the one or more functional groups reactive with the at least one catechol compound include one or more functional groups selected from the group consisting of (meth)acryl groups, secondary amino groups, primary amino groups, thiol groups and hydroxyl groups.

Aspect 3: The method of Aspect 1 or 2, wherein the at least one catechol compound includes at least one amine-functionalized catechol compound or salt thereof.

Aspect 4: The method of Aspect 1 or 2, wherein the at least one catechol compound includes at least one catechol compound selected from the group consisting of catechol and aminoalkyl-functionalized catechols and salts thereof.

Aspect 5: The method of any of Aspects 1 to 4, wherein the at least one catechol compound includes at least dopamine or a salt thereof.

Aspect 6: The method of any of Aspects 1 to 5, wherein the at least one co-reactant compound includes at least one amine compound.

Aspect 7: The method of Aspect 6, wherein the at least one amine compound includes at least one polyamine containing two or more amine groups per molecule which are primary amine groups, secondary amine groups or both primary and secondary amine groups.

Aspect 8: The method of Aspect 6 or 7, wherein the at least one amine compound includes at least one oligomeric or polymeric amine compound comprising a plurality of repeating units having structure —[$CH_2CH_2NH$]—.

Aspect 9: The method of any of Aspects 6 to 8, wherein the at least one amine compound includes at least one linear or branched polyethyleneimine.

Aspect 10: The method of any of Aspects 1 to 5, wherein the at least one catechol compound includes at least one amino-functionalized catechol compound or salt thereof and the at least one co-reactant compound comprises at least one (meth)acryl functional group.

Aspect 11: The method of any of Aspects 1 to 10, wherein the at least one preformed reaction product includes at least one preformed reaction product which is polymeric.

Aspect 12: The method of any of Aspects 1 to 11, wherein the at least one preformed reaction product is obtained by reacting the at least one catechol compound and the at least one co-reactant compound under oxidative conditions.

Aspect 13: The method of any of Aspects 1 to 12, wherein the at least one preformed reaction product is obtained by reacting the at least one catechol compound with the at least one co-reactant compound in an aqueous reactant mixture at a temperature of from 10 to 100° C. for a time of from 1 to 20 hours in the presence of molecular oxygen (desirably, in the absence of any conversion-coated metal surfaces).

Aspect 14: The method of any of Aspects 1 to 13, wherein the at least one preformed reaction product is present in the aqueous mixture at a concentration of from 5 to 500 ppm.

Aspect 15: The method of any of Aspects 1 to 14, wherein contacting the conversion-coated metal substrate with the aqueous mixture is carried out for a time of from 10 seconds to 10 minutes at a temperature of 10 to 54° C.

Aspect 16: The method of any of Aspects 1 to 15, wherein the aqueous mixture, when contacted with the surface of the conversion-coated metal substrate, has a pH of from 4.5 to 11.

Aspect 17: The method of any of Aspects 1 to 16, additionally comprising applying at least one paint layer to the sealed conversion-coated metal substrate.

Aspect 18: The method of Aspect 17, wherein applying at least one paint layer comprises electrophoretic coating.

Aspect 19: The method of any of Aspects 1 to 18, wherein the conversion-coated metal substrate has been conversion-coated by zinc phosphating or by deposition of a Group IV metal oxide.

Aspect 20: An article comprising a metal substrate, a conversion coating layer on at least one surface of the metal substrate, and a seal layer comprised of at least one preformed reaction product of at least one catechol compound and at least one co-reactant compound comprised of one or more functional groups reactive with the at least one catechol compound deposited on the conversion coating layer.

Aspect 21: The article of Aspect 20, additionally comprising at least one paint layer on the seal layer.

Treating a conversion-coated metal substrate surface with an aqueous mixture comprised of (in addition to water) at least one preformed reaction product of at least one catechol compound and at least one co-reactant compound comprised of one or more functional groups reactive with the at least one catechol compound has been found to significantly enhance corrosion resistance. That is, such treatment has been found to provide a sealed conversion-coated metal substrate having improved corrosion performance, as compared to the untreated conversion-coated metal substrate.

Such treatment forms a seal layer comprised of the preformed catechol compound/co-reactant compound reaction product(s) on at least part of the surface of the conversion coating present on the metal substrate surface. Such seal layer of preformed catechol compound/co-reactant compound reaction product improves the corrosion performance of the conversion-coated metal substrate. Deposition of effective amounts of the preformed catechol compound/co-reactant compound reaction product(s) onto conversion-coated metal substrate surfaces typically occurs much more quickly than is observed using the techniques known in the art for depositing polydopamine onto metal substrate surfaces (e.g., minutes rather than hours). That is, deposition times are significantly reduced. Further, it has been discovered that effective enhancement of corrosion resistance is imparted to conversion-coated metal substrate surfaces even when the preformed reaction products are prepared using low levels of catechol compound (relative to the level of co-reactant compound employed when reacting the catechol compound(s) and co-reactant compound(s)).

DETAILED DESCRIPTION OF CERTAIN EMBODIMENTS OF THE INVENTION

Preformed Catechol Compound/Co-Reactant Compound Reaction Products

As previously mentioned, an aqueous mixture comprised of at least one preformed reaction product of at least one catechol compound and at least one co-reactant compound comprised of one or more functional groups reactive with the at least one catechol compound ("preformed catechol compound/co-reactant compound reaction product") is utilized in the method of the present invention. Generally, the catechol compound(s) and co-reactant compound(s) are selected and reacted to provide one or more organic reaction products in which multiple organic residues or moieties derived from these reactants are covalently bonded to each other. Typically, the reaction product(s) formed is/are polymeric. For example, the preformed reaction product may be a cross-linked polymer. According to advantageous embodiments of the invention, the preformed reaction products are soluble in water. For example, the preformed reaction products may have a solubility in water at 25° C. of at least 0.5%, at least 1%, at least 5% or at least 10% by weight. Preferably, storage-stable solutions are provided using such preformed reaction products. However, in other embodiments, the preformed reaction products may be dispersible in water, preferably providing storage-stable dispersions.

Catechol Compounds

The term "catechol compound" as used herein means an organic compound with an aromatic ring system that includes at least two hydroxyl groups positioned on adjacent carbon atoms of the aromatic ring system. Suitable catechol compounds include compounds containing at least one 1,2-dihydroxybenzene moiety, i.e., an aromatic ring with hydroxyl groups ortho to each other, wherein the aromatic ring may be substituted with one or more substituents other than hydrogen at positions other than where the hydroxyl groups appear. Combinations of two or more different catechol compounds may be used.

According to certain aspects of the invention, one or more catechol compounds in accordance with formula (I) may be utilized:

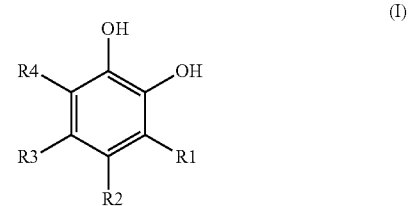

(I)

R1, R2, R3 and R4 may be the same as or different from each other and may be hydrogen or any suitable substituent that replaces hydrogen such as, for example, alkyl (e.g., C1-C12 alkyl such as methyl, ethyl, n-propyl, n-butyl and isomers thereof), alkenyl, halo, aminoalkyl, hydroxyalkyl, carboxy, alkoxy, aryl, aroxy, nitro, sulfo and the like and combinations thereof. In certain advantageous embodiments of the invention, the catechol compound contains at least one amine functional group, such as a primary or secondary amine group. The amine functional group may be in the form of a salt (e.g., a halide salt).

According to certain embodiments, the catechol compound is soluble in water. For example, the catechol compound may have a solubility in water (e.g., pure neutral water) at 25° C. of at least 10 g/L, at least 50 g/L, at least 100 g/L or even higher. In other embodiments, however, the catechol compound may be dispersible in water.

Illustrative, non-limiting examples of suitable catechol compounds include catechol, alkyl-substituted catechols (e.g., 3-methyl catechol, 4-methyl catechol, p-t-butyl catechol, 3-ethyl catechol, 3,5-di-t-butyl catechol, 3-isopropyl catechol, 4-isopropyl catechol, 4-propyl catechol, 3-propyl catechol, 4-pentyl catechol, 4-butyl catechol, 3,4-dimethyl catechol), aminoalkyl-substituted catechols and salts thereof (such as dopamine, 3,4-dihydroxy-L-phenylalanine, epinephrine, norepinedrine, α-methyldopamine, 4-(2-(ethylamino)-1-hydroxyethyl)catechol, N-isopropyl dopamine, 4-(2-aminopropyl)catechol, 3,4-dihydroxybenzylamine, N-methyl dopamine, N,N-dimethyl dopamine, 6-fluoro dopamine, dopexamine, 5-aminoethylpyrogallol, and salts thereof, particularly hydrohalide salts thereof), hydroxylalkyl-substituted catechols (e.g., 3,4-dihydroxybenzyl alcohol, 4-hydroxymethyl catechol), alkenyl-substituted catechols (e.g., 3,4-dihydroxystyrene), halo-substituted catechols (e.g., 4-chloro catechol, 4-fluoro catechol, 3-fluoro catechol, 4,5-dichloro catechol, tetrabromo catechol, tetrachloro catechol), alkoxy-substituted catechols (e.g., 3-methoxy catechol, 4-methoxy catechol), aroxy-substituted catechols (e.g., 3-phenoxy catechol), aryl-substituted catechols (e.g., 4-phenyl catechol, 3,3',4,4'-tetrahydroxybibenzyl), carboxy-substituted catechols (e.g., 3,4-dihydroxyacetophenone, 3,4-dihydroxybutyrophenone, 4-(chloroacetyl) catechol, ethyl 3,4-dihydroxybenzoate), nitro-substituted catechols (e.g., 4-nitro catechol, 3,4-dinitro catechol), sulfo-substituted catechols (e.g., 4-sulfo catechol and salts thereof), amino-substituted catechols (e.g., 4-amino catechol, 6-amino dopamine) and the like. Combinations of two or more different catechol compounds may be used.

Co-Reactant Compounds

One or more co-reactant compounds are reacted with one or more catechol compounds to form preformed reaction products useful in the present invention. Suitable co-reactant compounds (sometimes referred to herein as "functionalized co-reactant compound") are compounds comprised of one or more (preferably two or more) functional groups per molecule selected from the group consisting of (meth)acryl groups, secondary amino groups, primary amino groups, thiol groups and hydroxyl groups. In a preferred embodiment, at least one co-reactant compound is utilized which is comprised of two or more primary and/or secondary amino groups per molecule. According to further embodiments of the invention, the co-reactant compound comprises at least 3, 4, 5, 10, 15, 20, 25, 30, 35, 40, 45, 50, 75, 100, 200 or more reactive functional groups (e.g., (meth)acryl groups, secondary amino groups, primary amino groups, thiol groups and/or hydroxyl groups) per molecule. Where the co-reactant compounds contain two or more functional groups per molecule, the functional groups may be the same as or different from each other.

Without wishing to be bound by theory, secondary amino groups, primary amino groups, thiol groups and hydroxyl groups may be considered to be nucleophilic functional groups capable of forming covalent bonds at one or more sites within the catechol compound(s) through nucleophilic reactions such as, for example, Michael addition reactions and the like. As used herein, the term (meth)acryl group refers to functional groups characterized by an acryl structure (—C(=O)CH=CH$_2$) or methacryl structure (—C(=O)C(CH$_3$)=CH$_2$), such as acrylate (—OC(=O)CH=CH$_2$), methacrylate (—OC(=O)C(CH$_3$)=CH$_2$), acrylamide (—NHC(=O)CH=CH$_2$) or methacrylamide (—NHC(=O)C(CH3)=CH$_2$). According to one embodiment of the invention, where a co-reactant compound comprising one or more (meth)acryl functional groups is employed, at least one catechol compound comprised of a primary amino, secondary amino, thiol or hydroxyl group is also used which is capable of reacting with the (meth)acryl functional group(s) (such as through a Michael-type addition reaction, for example).

The co-reactant compound may be monomeric, oligomeric or polymeric. Suitable co-reactant compounds include, for example, polyamines, polythiols and polyalcohols, comprising a plurality of primary and/or secondary amino, thiol or hydroxyl groups per molecule. The functional groups may be substituted on aliphatic and/or aromatic carbon atoms.

In desirable embodiments of the invention, the co-reactant compound or combination of co-reactant compounds is soluble in water. For example, the co-reactant compound may have a solubility in water at 25° C. of at least 10 g/L, at least 50 g/L, at least 100 g/L or even higher. However, in other embodiments, the co-reactant compound(s) may be dispersible in water.

Advantageous embodiments of the invention include embodiments in which the at least one co-reactant compound includes at least one oligomeric or polymeric amine compound comprising a plurality of repeating units having structure —[CH$_2$CH$_2$NH]—. Such oligomeric and polymeric amine compounds may be linear or branched in structure. One or more polyethyleneimines, either linear or branched, may be used as the co-reactant compound(s), in accordance with desirable embodiments of the invention. The polyethyleneimine may have, for example, a number average molecular weight of 200 to 100,000, 500 to 50,000 or 800 to 25,000, although higher molecular weight polyethyleneimines (e.g., having number average molecular weights of up to 2,000,000) may also be utilized. Modified polyethyleneimines, such as ethoxylated polyethyleneimines, also are suitable for use.

Other illustrative, non-limiting examples of suitable co-reactant compounds include amines corresponding to the structural formula H$_2$N(CH$_2$CH$_2$NH)$_n$CH$_2$CH$_2$NH$_2$, where n is 0 or an integer of from 1 to 10, polyether polyols, polyester polyols, amine-terminated polyether polyols, thiol-terminated polyether polyols, polyvinyl alcohols, polyallylamines, polyvinylamines and the like. The co-reactant compound(s) may be linear or branched in structure (including hyper-branched and dendritic structures).

Examples of suitable co-reactant compounds comprised of one or more (meth)acryl functional groups include methacrylamidoethyl ethylene urea.

Methods of Making Preformed Catechol Compound/Co-Reactant Compound Reaction Products The preformed reaction products of catechol compounds and functionalized co-reactant compounds used in the present invention may be prepared using any suitable technique. For example, the reaction may be carried out under oxidative conditions and/or conditions effective to achieve condensation of the catechol compound(s) and the functionalized co-reactant compound(s), thereby forming a polymeric reaction product. The precise reaction mechanisms are not well understood and the reaction products obtained are generally complex in structure. However, in at least some cases, it is believed that at least a portion of the reaction proceeds by way of Michael addition of a nucleophile in one of the reactants (e.g., a Michael addition donor) to an electrophilic site (e.g., a Michael addition acceptor) in the other reactant. For example, where the co-reactant compound contains an amino, thiol or hydroxyl group, such nucleophilic functional group may add to the catechol compound via a Michael addition-type reaction. As another example, where the catechol compound contains a nucleophilic group such as a primary or secondary amino group, such nucleophilic group may add to a (meth)acryl group in the co-reactant compound (again, by way of a Michael addition-type mechanism). Such Michael addition type reactions typically result in the formation of covalent heteroatom-carbon bonds (e.g., nitrogen-carbon covalent bonds). However, other types of reactions resulting in the formation of covalent bonds between the reactants may also take place. Internal reaction of one or more of the reactants may also occur; for example, when the catechol compound is an aminoethyl-substituted catechol such as dopamine, cyclization of the aminoethyl group to form an indole group may be observed. Carbon-carbon and/or nitrogen-nitrogen coupling reactions may also take place.

According to at least certain aspects, the catechol compound(s), the functionalized co-reactant compound(s) and the preformed reaction product(s) are all soluble in water. However, in other embodiments, one or more of the catechol compound(s), the functionalized co-reactant compound(s) and/or the preformed reaction product(s) are dispersible in water.

Exemplary methods of forming reaction products suitable for use in accordance with the present invention may comprise the following steps:
  a) forming a reaction mixture comprised of an aqueous reactant mixture of at least one catechol compound and at least one co-reactant comprised of one or more functional groups reactive with the at least one catechol compound (e.g., one or more functional groups selected from the group consisting of (meth)acryl groups, secondary amino groups, primary amino groups, thiol groups and hydroxyl groups); and
  b) reacting the reaction mixture under oxidative conditions (for example, conditions selected such that oxygen is introduced into the reaction mixture, in the form of air or other oxygen-containing gas; oxidants other than molecular oxygen may also be used) for a time sufficient to react the at least one catechol compound with the at least one co-reactant compound to form at least one preformed reaction product; and optionally
  c) purifying the at least one preformed reaction product.

Oxidative conditions may be provided by introducing molecular oxygen ($O_2$) and/or other oxidants (oxidizing agents) into the reaction mixture. Suitable illustrative oxidants include, in addition to molecular oxygen, ozone, peroxide compounds (e.g., hydrogen peroxide), persulfates and the like.

Oxygen may be introduced into the reaction mixture by methods known to those of skill in the art, including by way of non-limiting example, bubbling or sparging air or oxygen into the reaction mixture, shaking or stirring the reaction mixture to introduce air bubbles and the like. Reaction conditions include maintaining a temperature in a range of about 10° C. to about 100° C., desirably in a range of 14° C. to 60° C., and preferably about 20 to 50° C. for a period of time sufficient to form the desired quantity of preformed reaction products of the catechol compound(s) and co-reactant compound(s). Higher reaction temperatures (e.g., temperatures above 100° C.) may also be employed, particularly where the reaction is carried out under pressure or in a sealed vessel. Reaction conditions generally are selected such that the reaction mixture remains liquid. Reaction time may range from 1 to 20 hours, desirably from about 3 to about 14 hours, and in one embodiment can be from 5 to 7 hours. The reaction time in other embodiments may be as little as 30 minutes, depending upon the reactivity of the catechol compound(s) and co-reactant compound(s), the reaction temperature and pressure, and oxidant (e.g., 02) availability, among other factors, provided such conditions do not negatively affect the performance of the resulting reaction product(s) to an unacceptable extent. The reaction product(s) may be produced in a continuous synthesis process, using any of the procedures known in the polymer art; in such a process, a residence time of as little as 5 to 30 minutes may be employed.

In one embodiment, a preformed reaction product suitable for using in the form of an aqueous mixture as a sealer after conversion-coating a metal substrate surface may be made by a process comprising the following steps: a) providing an aqueous reactant mixture of at least one catechol compound (e.g., dopamine or a halide salt of dopamine) and at least one co-reactant compound comprised of one or more functional groups selected from the group consisting of (meth)acryl groups, secondary amino groups, primary amino groups, thiol groups and hydroxyl groups (e.g., a polyethyleneimine); and b) stirring the aqueous reactant mixture with vigorous vortex inducing stirring at a temperature of 20 to 50° C. for a period of time from 5 to 7 hours to thereby form preformed reaction products of the catechol compound(s) and co-reactant compound(s).

The molar ratio of catechol compound(s) to reactive functional groups ((meth)acryl, amino, thiol, hydroxyl) in the co-reactant compound(s) is not believed to be particularly critical. However, in certain embodiments, a molar ratio of catechol compound(s) to reactive functional groups in the co-reactant compound(s) is from 1:0.05 to 1:25 or 1:0.05 to 1:10. It will generally be desirable to select a molar ratio which is effective to provide preformed reaction products which are water-soluble, e.g., reaction products which have a solubility in water at 25° C. of at least 0.1, at least 1, at least 5 or at least 10% by weight. According to one embodiment, the reactive functional groups of the co-reactant compound(s) are in molar excess relative to the catechol compound. The amount by weight of catechol compound need not be particularly high; that is, preformed catechol compound/functionalized co-reactant compound reaction products that are effective in enhancing the corrosion resistance of a conversion-coated metal substrate surface may be prepared using relatively low weight amounts of catechol compound (e.g., 5 to 25, 5 to 20 or 5 to 15% by weight in total of catechol compound(s) based on the total weight of catechol compound and functionalized co-reactant compound).

The preformed reaction products obtained may be subjected to one or more purification steps prior to being used in an aqueous sealer solution (working bath) in accordance with the present invention. Such methods include, by way of illustration, filtration, dialysis, membrane treatment, ion exchange, chromatography and the like and combinations thereof. For example, halide salts may be formed as by-products, depending upon the reactants used to prepare the preformed reaction product. If the presence of such halide salts (chloride salts, in particular) is determined to be detrimental to the performance of the sealer solution, they may be removed or reduced by any suitable method, such as treatment with an ion exchange resin capable of exchanging a less harmful anion for the halide. If unreacted catechol compound and/or unreacted co-reactant compound is present, together with preformed reaction product, such unreacted materials may, if so desired, be removed before using the preformed reaction product in a sealing step. In certain embodiments of the invention, however, the aqueous mixture when used as a sealer additionally is comprised of unreacted catechol compound(s), unreacted co-reactant compound(s) or both unreacted catechol compound(s) and unreacted co-reactant compound(s) in addition to preformed reaction product.

An advantage of the present invention is that aqueous mixtures of preformed catechol compound/functionalized co-reactant compound reaction products may be prepared in advance and conveniently stored in stable form until such time as it is desired to apply the preformed catechol compound/functionalized co-reactant compound reaction products to a conversion-coated metal substrate surface. Thus, forming the reaction products in situ during a sealing operation, which would likely lead to significant delays in processing time, is not necessary.

As used herein, the term "storage-stable" when referring to a mixture (whether a solution or a dispersion) means that the mixture after being stored in a sealed container over a period of observation of at least 3 months at 20° C., during which the mixture is mechanically undisturbed, exhibits no phase separation and no precipitation or settling out of any material that is visible to the unaided human eye.

Sealer Solutions

According to aspects of the invention, an aqueous mixture ("sealer solution") comprising, in addition to water, at least one preformed reaction product of at least one catechol compound and at least one co-reactant compound comprised of one or more functional groups reactive with the at least one catechol compound is brought into contact with a conversion-coated metal substrate surface. Such an aqueous mixture (which may be in the form of a solution or dispersion and preferably is a storage-stable mixture) may be formed by any suitable method. For example, where the at least one preformed reaction product is obtained as an aqueous mixture (as a result of carrying out the reaction of catechol compound and functionalized co-reactant compound while the reactants are dissolved in water, for example), such an aqueous mixture may be used directly or after dilution of the aqueous mixture to a particular desired end-use concentration. Water alone may be used for such dilution, but in other embodiments of the invention it is contemplated that one or more other types of components may be included in the aqueous mixture. For example, an acid, base or buffer may be combined into the aqueous mixture to modify its pH characteristics. The aqueous mixture in certain embodiments of the invention is basic, but in other embodiments may be acidic or neutral. In certain embodiments of the invention, the pH of the aqueous mixture, when contacted with a surface of a conversion-coated metal substrate (i.e., when used in a working sealer bath) may be from 4.5 to 11, from 7 to 10.5 or from 8.5 to 10, for example.

As used (i.e., when contacted with a conversion-coated metal substrate surface), the aqueous mixture may have a concentration of preformed catechol compound/co-reactant compound reaction product of, for example 5 to 10,000 ppm, 5 to 5000 ppm, 5 to 4000 ppm, 5 to 3000 ppm, 5 to 2000 ppm, 5 to 1500 ppm, 5 to 1000 ppm, 5 to 750 ppm or 5 to 500 ppm.

Also contemplated by the present invention is the utilization of concentrates comprising water and preformed catechol compound/co-reactant compound reaction product(s), wherein the concentration of preformed reaction product is higher than the desired concentration of preformed reaction product in the aqueous mixture to be contacted with a conversion-coated metal substrate surface. The concentrate may be combined with an amount of water effective to achieve such desired end-use concentration. The concentration of preformed catechol compound/co-reactant compound reaction product in such a concentrate may be, for example, 0.25 to 90% by weight or 1 to 75% by weight.

A working bath containing the aqueous mixture (sealer solution) repeatedly contacted with conversion-coated metal substrate surfaces can, over time, become depleted with respect to the concentration of preformed catechol compound/co-reactant compound reaction product. Should this happen, the working bath may be replenished by addition of an amount of preformed catechol compound/co-reactant compound reaction product (in concentrate form, for example) effective to restore the desired concentration. Further, it is understood that a repeatedly used working bath may accumulate some amount of various components carried over from a conversion coating stage. When the levels of such components reach a point where the performance of the working bath or the quality of the sealed conversion-coated metal substrates being processed becomes adversely affected, the working bath may be discarded and replaced or treated to remove or reduce such components or otherwise counteract their effect (by pH adjustment and/or ion exchange, for example).

Use of Sealer Solutions

An aqueous mixture (in the form of a solution or dispersion, preferably a storage-stable solution or dispersion) comprised of preformed catechol compound/co-reactant compound reaction product(s) is contacted with a conversion-coated surface of a metal substrate, in accordance with the present invention. Such contacting may be accomplished by any suitable method, such as, for example, spraying, immersion, dipping, brushing, roll-coating or the like. Typically, the aqueous mixture during such contacting is maintained at a temperature of from ambient temperature (e.g., room temperature) to a temperature moderately above ambient temperature. For instance, the temperature of the aqueous mixture may be from 16 to 49° C. or from 16 to 27° C.

The contact time should be selected to be a time sufficient to deposit an effective amount of catechol compound/co-reactant compound on the conversion-coated metal substrate surface, which may generally be regarded as an amount effective to improve the corrosion resistance of the conversion-coated metal substrate surface, as compared to a control where the conversion-coated metal substrate surface is contacted with water alone under the same conditions. Typically, contact times of from 0.1 to 30 minutes (e.g., 5 seconds to 20 minutes or 30 seconds to 6 minutes) will be suitable.

Once the desired contact time has been reached, contacting is discontinued and the resulting sealed conversion-coated metal substrate may be taken on to further processing steps. For example, spraying may be stopped or the article comprising the metal substrate may be removed from an immersion bath. Residual or surplus aqueous mixture may be permitted to drain from the surface of the metal substrate. Removal of residual or surplus aqueous mixture can be accomplished by any suitable method or combination of methods, such as drip-drying, squeegeeing, draining or rinsing with water. According to certain embodiments, the sealed conversion-coated metal substrate surface may be dried (e.g., air-dried, heat-dried or oven-dried). In other embodiments, the sealed conversion-coated metal substrate may be rinsed (with deionized water, for example). In still further embodiments, at least one paint layer is applied to the sealed conversion-coated metal substrate surface, as described in more detail below. Combinations of two or more of such further processing steps may be employed. For example, the sealed conversion-coated metal substrate surface may be rinsed with water (e.g., deionized water) and then subjected to electrophoretic coating, e.g., coating in a wet-on-wet process.

Metal Substrates

The present invention is particularly useful in connection with the treatment of conversion-coated metal substrate surfaces requiring further enhancement of their corrosion resistance, beyond that provided by the conversion coating alone. Ferrous (iron-containing) metal substrates may be treated in accordance with the present invention, for example. Exemplary metal substrates include, without limitation, iron; steel substrates such as cold rolled steel, hot rolled steel, and stainless steel; steel coated with zinc metal, zinc alloys such as electrogalvanized steel, galvalume, galvanneal, and hot-dipped galvanized steel; magnesium alloys; aluminum alloys and aluminum plated steel substrates. A component containing more than one type of metal substrate can be processed in accordance with the procedures set forth herein. The present invention may also be practiced using metal substrates in which at least one surface is not completely conversion-coated (i.e., where at least a portion of the underlying metal substrate surface is exposed, which may occur for example as a result of processing deficiencies during conversion coating or operations carried out on the conversion-coated metal substrate after conversion coating which result in partial removal of the conversion coating layer, such as cutting, forming, sanding, scoring, grinding, polishing, abrading or the like). Treatment with an aqueous mixture of preformed catechol compound/co-reactant compound reaction product will assist in imparting enhanced corrosion resistance to the exposed metal substrate portions, thereby helping to counteract any less-than-complete coverage of the metal substrate surface by a conversion coating.

Conversion Coating

A metal substrate is subjected to conversion coating to prepare a conversion-coated metal substrate to be sealed in accordance with the present invention. Any known conversion coating technology may be practiced in order to prepare such a conversion-coated metal substrate. Conversion coatings are coatings for metals in which the surface of a metal is converted into the coating using a chemical or electrochemical process. Examples include chromate conversion coatings, phosphate conversion coatings (e.g., iron phosphate coatings, zinc phosphate coatings), phosphate-free conversion coatings, Group IV metal oxide coatings (e.g., zirconium oxide coatings), bluing, black oxide coatings on steel, and anodizing. In typical chemical conversion coating processes, a metal substrate surface (which may have been previously cleaned and/or rinsed, with water alone and/or a pre-rinse solution) is contacted with a conversion coating composition for a time and at a temperature effective to form a conversion coating layer on the metal substrate surface, the optimum or suitable conditions being determined by the nature of the metal substrate surface and the components present in the conversion coating composition, with such conditions being familiar to or readily ascertained by those skilled in the art. Conversion coatings may be used for corrosion protection, to add decorative color or appearance to a metal substrate and as paint primers.

For example, a conversion coating step may involve the use of an acidic aqueous conversion coating composition comprised of one or more Periodic Table Group IV metals such as Zr, Ti and Hf, typically containing other components as well (such as a metal etchant (e.g., free fluoride), optionally also one or more additional components such as copper, nitrate, zinc and/or Si-based substances). Such conversion coating compositions are sometimes referred to as Group IV metal oxide-depositing conversion coating compositions (e.g., zirconium oxide-depositing conversion coating compositions). One such conversion coating composition is known as Bonderite® M-NT 1820, sold by Henkel, which is based on Zr as the Group IV metal The aqueous acidic conversion coating may, for example have a pH of 5.0 or less and comprise: 50 to 750 ppm of at least one Group IV metal; 0 to 50, 1 to 50 or 5 to 50 ppm of copper; 10 to 100 ppm of free fluoride (or other metal etchant) optionally, greater than 3500 ppm of nitrate; and, optionally, Si-based substances such as silanes, $SiO_2$, silicates and the like.

In one embodiment, a conversion coating composition (in particular, a Group IV metal oxide-depositing conversion coating composition) may be applied to a surface of a reactive metal substrate by contacting the metal substrate with the conversion coating composition for approximately 2 minutes at a temperature of 24-40° C. Contacting may be accomplished by any suitable means including but not limited to dipping, spraying, roll-coating and the like. Contact times and temperatures may be varied, but are typically less than 10, preferably less than 5 minutes. Desirably contact time is at least about 1, 3, 5, 10, 15, 20, 30, 40, 50 or 60 seconds and is no more than about 9, 8, 7, 6, 5, 4, 3 or 2 minutes. Desirably temperature ranges from at least about 21, 22, 23, 24, 25, 26, 27, 28, 29, 30, 31 or 32° C. and no more than about 40, 39, 38, 37, 36, 35, 34 or 33° C., Higher or lower temperatures, for example at least greater than the freezing point of the bath and up to 50° C., may be employed provided that they do not interfere with deposition of the conversion coating or negatively affect the metal pretreatment working bath or performance of the conversion coating.

The present invention is also particularly useful in connection with the sealing of metal surfaces having metal phosphate (e.g., zinc phosphate) conversion coatings formed thereon. Zinc phosphating is a type of conversion coating well known in the art, wherein a metal substrate is contacted with a zinc phosphating composition. Present day zinc phosphate coating solutions are dilute aqueous solutions of phosphoric acid, zinc and other chemicals (e.g., other metal cations such as nickel and/or manganese as well as other types of ions such as nitrate, nitrite, chlorate, fluoroborate and/or silicofluoride) which, when applied to the surface of a metal react with the metal surface forming an integral layer on the surface of the metal of a substantially insoluble zinc phosphate coating, which may be amorphous or crystalline. The zinc phosphating compositions sold by Henkel Corporation under the brand name "Bonderite" may be utilized such as, for example, Bonderite® M-ZN 958.

Treatment of the conversion-coated metal substrate surface with an aqueous mixture of preformed catechol compound/co-reactant compound reaction product may take place immediately after a conversion coating step, according to one aspect of the invention. According to other embodiments, however, the conversion-coated metal substrate may be stored for a period of time and/or may be subjected to one or more manipulative steps after conversion coating (such as cutting or forming) before being contacted with a sealer solution in accordance with the present invention. In yet another variation, the conversion-coated metal substrate may be contacted with a sealer solution in accordance with the invention directly after conversion coating and then again after being subjected to one or more further manipulative steps.

Prior to conversion coating, the metal substrate may be prepared or treated using any suitable technique such as, for example, cleaning (e.g., with an alkaline cleaner), rinsing, conditioning, activation or the like or combination thereof. Following conversion coating, the conversion-coated metal substrate may be immediately contacted with a sealer solution in accordance with the present invention or may be subjected to one or more intermediate processing steps such as rinsing (either with water alone or a rinse solution other than a sealer solution in accordance with the present invention) prior to treatment with the sealer solution.

Application of Additional Coatings

Following application of at least one seal layer (comprised of preformed catechol compound/functionalized co-reactant compound reaction product(s)), a sealed conversion-coated metal substrate may be subjected to one or more further processing steps, including in particular the application of a paint or other decorative and/or protective coating. In such applications, the sealed conversion coating may function as a primer or anti-corrosion layer. Any such coating known in the art may be employed, including for example, electrophoretic coatings (E-coatings), solvent-borne paints, aqueous-borne paints, powder coating and the like.

In accordance with one aspect of the invention, an electrophoretic coating is applied to a sealed conversion-coated metal substrate prepared in accordance with the present invention. Electrophoretic coating (sometimes also referred to as electrophoretic deposition) generally is a process in which a metal part is immersed in a water-based composition comprising a paint (resin) emulsion. An electric voltage is applied to the part, causing the paint emulsion to condense onto the part. The part is then withdrawn from contact with the water-based composition and baked to cure the deposited coating (paint). Any of the known electrophoretic coating materials, methods and conditions known or conventional in the art may be utilized. Examples of such electrophoretic coatings include those sold under the brand name "Catho-Guard" by BASF.

Accordingly, the present invention may be practiced in accordance with the following exemplary multi-step process:

1) cleaning of a metal substrate surface;
2) rinsing of the cleaned metal substrate surface;
3) conversion coating of the cleaned and rinsed metal substrate surface;
4) rinsing of the conversion-coated metal substrate surface with water;
5) sealing of the rinsed conversion-coated metal substrate surface with an aqueous mixture of preformed catechol compound/functionalized co-reactant reaction product(s);
6) optionally, rinsing of the sealed conversion-coated metal substrate surface with water;
7) electrophoretic coating of the rinsed and sealed conversion-coated metal substrate surface;
8) rinsing of the electrophoretic-coated metal substrate surface with water; and
9) baking of the rinsed electrophoretic-coated metal substrate Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of a composition, article or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1: Sealing of Zirconium Oxide Conversion Coatings 1.8 grams of dopamine hydrochloride and 15.0 grams of commercially available polyethyleneimine, molecular weight ~800) were dissolved in 405 grams of deionized water and allowed to react with vigorous agitation for 6 hours at ambient temperature (20-25° C.). Vigorous agitation is used to introduce oxygen to the reaction mixture, which promotes the desired reaction. The preformed reaction product was purified using Dow Amberlite® IRN78 ion exchange resin to remove residual chloride content. This purified reaction product is designated as "Dopamine/PEI Reaction Product A".

Dopamine/PEI Reaction Product A was incorporated into an aqueous pretreatment sealer solution at a concentration of 200 ppm. The operating conditions of this sealer stage were as follows: pH=9.7; Temperature=24° C. A conversion coating composition based on fluorozirconic acid, Bonderite® M-NT 1820 (Henkel Corporation), was prepared using fluorozirconic acid, copper, zinc, colloidal silica, source of nitrate, and ammonium bicarbonate. The operating conditions of the conversion coating composition were as follows: Zr=150 ppm (0.15 g/l), Cu=20 ppm, Zn=600 ppm, Si=50 ppm, Free F=25 ppm, pH=4.0, Temperature=32° C. This composition was used to coat ACT CRS panels and these panels were subsequently painted with BASF CathoGuard® 800 in an electrophoretic coating process. The dry-film (paint) thickness was 20 microns, as determined by Elcometer Coating Thickness Gauge.

Process:

Clean: Bonderite® C-AK T51; 49° C.; 60 second spray; Free Alkalinity=5.5 pts.; pH=11.7

Clean: Bonderite® C-AK T51; 49° C.; 120 second immersion; Free Alkalinity=5.5 pts.; pH=11.7

Rinse: City Water; 43° C.; 60 second spray

Rinse: DI Water; 24° C.; 1 minute immersion

Conversion Coating: Bonderite® M-NT 1820; 32° C.; 120 second immersion. Zr=150 ppm; Cu=20 ppm; Zn=600 ppm; Si=50 ppm; FF=25 ppm; pH=4.0

[Rinse: DI water; 21° C.; 75 second spray (control)]

or

[Rinse: Dopamine/PEI Reaction Product A sealer solution; 24° C.; 60 second immersion Rinse: DI Water; 21° C.; 15 second spray]

E-coat: BASF CathoGuard® 800; 230V; 35° C.; 134 second immersion

Rinse: DI water; 21° C.; 60 second spray

Bake: 182° C.; 40 minutes

Results:

These panels were tested using a 10 day hot salt water soak at 5% NaCl and 55° C. The resulting creep from scribe was measured to be as follows:

| Candidate | CRS* |
|---|---|
| Bonderite ® M-NT 1820 Control | 1.9 |
| Bonderite ® M-NT 1820 + Dopamine/PEI Reaction Product A Seal | 0.7 |

*Corrosion in mm from creep, U/2 (Average affected paint across scribe divided by 2).
Note:
3 replicates A set of ACT CRS panels was tested for corrosion resistance using the test method GMW14872, Exposure C (23 cycles). The corrosion results were as follows:

| Candidate | Maximum | Average |
|---|---|---|
| Bonderite ® M-NT 1820 Control | 4.4 | 3.1 |
| Bonderite ® M-NT 1820 + Dopamine/PEI Reaction Product A Seal | 3.4 | 2.3 |

Corrosion in mm.
Note:
3 replicates

The paint adhesion was tested per GMW14829/14704. Results are reported in the following table as percentage of paint remaining.

| Candidate | Initial | 24 Hr soak at 63° C. | 48 Hr soak at 63° C. |
|---|---|---|---|
| Bonderite ® M-NT 1820 Control | 100 | 95-98 | 98 |
| Bonderite ® M-NT 1820 + Dopamine/PEI Reaction Product A Seal | 100 | 98 | 98-100 |

Note:
3 replicates

The sealer based on Dopamine/PEI Reaction Product A improves the corrosion resistance and paint adhesion performance, as demonstrated above.

Example 2: Sealing of Zinc Phosphate Conversion Coatings 21.22 grams of dopamine hydrochloride and 177.9 grams of commercially available polyethyleneimine, molecular weight ~800 were dissolved in 4802.6 grams of deionized water and allowed to react with vigorous agitation for 6 hours at ambient temperature (20-25° C.). Vigorous agitation is used to introduce oxygen to the reaction mixture, which promotes the desired reaction. The preformed reaction product was purified using Dow Amberlite® IRN78 ion exchange resin to remove residual chloride content. The purified product is designated as "Dopamine/PEI Reaction Product B".

Dopamine/PEI Reaction Product B was incorporated into a pretreatment sealer solution at a concentration of 200 ppm. The operating conditions of this sealer stage were as follows: pH=9.9; Temperature=24° C.

Panels coated with zinc phosphate, Bonderite® M-ZN 958 (Henkel), were purchased from ACT Test Panels Inc. The following conversion-coated substrates were evaluated: ACT CRS, ACT EG, ACT HDG, A16111T4, A16016T6, A15052H32.

Process:

These coated panels were treated with sealer as follows:

Rinse: DI Water; 24° C.; 30 second spray (control)

or

[Rinse: Dopamine/PEI Reaction Product B sealer solution; 24° C.; 60 second immersion Rinse: DI Water; 24° C.; 30 second spray]

Followed by painting with BASF CathoGuard® 800 Electrocoat; 200V; 35° C.; 134 second immersion Rinse: DI water; 21° C.; 60 second spray Bake: 182° C.; 40 minutes The dry-film (paint) thickness was 20 microns, as determined by Elcometer Coating Thickness Gauge.

Results:

The painted panels obtained were tested using a 10 day hot salt water soak at 5% NaCl and 55° C. The creep from scribe observed was as follows:

| Candidate | CRS* |
|---|---|
| Bonderite ® M-ZN 958 Control | 0.70 |
| Bonderite ® M-ZN 958 + Dopamine/PEI Reaction Product B Seal | 0.45 |

*Corrosion in mm from creep, U/2 (Average affected paint across scribe divided by 2).
Note:
3 replicates.

A set of painted panels was tested for corrosion resistance using GMW14872, Exposure C (26 cycles) for each of the substrates below. Corrosion was measured in mm, taking an average of 3 replicates. The corrosion results were as follows:

ACT CRS:

| Candidate | Maximum | Average |
|---|---|---|
| Bonderite ® M-ZN 958 Control | 6.8 | 4.9 |
| Bonderite ® M-ZN 958 + Dopamine/PEI Reaction Product B Seal | 6.0 | 3.8 |

ACT EG:

| Candidate | Maximum | Average |
|---|---|---|
| Bonderite ® M-ZN 958 Control | 5.4 | 3.7 |
| Bonderite ® M-ZN 958 + Dopamine/PEI Reaction Product B Seal | 5.2 | 3.1 |

ACT HDG:

| Candidate | Maximum | Average |
|---|---|---|
| Bonderite ® M-ZN 958 Control | 6.1 | 3.9 |
| Bonderite ® M-ZN 958 + Dopamine/PEI Reaction Product B Seal | 5.4 | 3.6 |

ACT A16111T4:

| Candidate | Maximum | Average |
| --- | --- | --- |
| Bonderite ® M-ZN 958 Control | 0.5 | 0.5 |
| Bonderite ® M-ZN 958 + Dopamine/Reaction Product B Seal | 0.5 | 0.5 |

ACT A16061T6:

| Candidate | Maximum | Average |
| --- | --- | --- |
| Bonderite ® M-ZN 958 Control | 0.5 | 0.5 |
| Bonderite ® M-ZN 958 + Dopamine/PEI Reaction Product B Seal | 0.5 | 0.5 |

ACT A15052H32:

| Candidate | Maximum | Average |
| --- | --- | --- |
| Bonderite ® M-ZN 958 Control | 0.5 | 0.5 |
| Bonderite ® M-ZN 958 + Dopamine/PEI Reaction Product B Seal | 0.5 | 0.5 |

The paint adhesion was tested per GMW14829/14704 on each of the following substrates processed according to Example 2: CRS, EG, HDG, A16111T4, A16061T6, A15052H32.

Results were reported as percentage of paint remaining and were the same for each of the Substrates: CRS, EG, HDG, A16111T4, A16061T6, A15052H32.

| Candidate | Initial | 24 Hr soak at 63° C. | 48 Hr soak at 63° C. |
| --- | --- | --- | --- |
| Bonderite ® M-ZN 958 Control | 100 | 100 | 100 |
| Bonderite ® M-ZN 958 + Dopamine/PEI Reaction Product B Seal | 100 | 100 | 100 |

Note:
3 replicates per substrate

Treatment with the Dopamine/PEI Reaction Product B sealer improves the corrosion resistance, as demonstrated above.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method, comprising contacting a surface of a metal substrate having a conversion coating layer thereon with an aqueous mixture comprised of at least one preformed reaction product of at least one catechol compound and at least one co-reactant compound comprised of one or more functional groups reactive with the at least one catechol compound to thereby deposit a seal layer comprising the at least one preformed reaction product on the conversion coating layer; wherein the at least one co-reactant compound comprises at least one linear or branched, oligomeric or polymeric polyethyleneimine having a number average molecular weight of 500 up to 2,000,000, wherein the at least one catechol compound includes at least one amino-functionalized catechol compound or salt thereof, and wherein the pre-formed reaction product comprises 5 to 25% by weight of the at least one catechol compound, based on total weight of the at least one catechol compound and the at least one co-reactant compound.

2. The method of claim 1, wherein the at least one amino-functionalized catechol compound or salt thereof comprises an aminoalkyl-functionalized catechol compound or salt thereof.

3. The method of claim 1, wherein the at least one catechol compound includes at least dopamine or a salt thereof.

4. The method of claim 1, wherein the at least one co-reactant compound further comprises a co-reactant compound comprising one more functional groups reactive with the at least one catechol compound, said functional groups are selected from the group consisting of acrylate groups, methacrylate groups, acrylamide groups, methacrylamide groups, secondary amino groups, primary amino groups, thiol groups and mixtures thereof.

5. The method of claim 1, wherein the polyethyleneimine comprises a plurality of primary and/or secondary amine groups.

6. The method of claim 1, wherein the polyethyleneimine comprises a hyper-branched and/or dendritic structure.

7. The method of claim 1, wherein the at least one preformed reaction product includes at least one preformed reaction product which is polymeric.

8. The method of claim 1, wherein the at least one preformed reaction product is water soluble and obtained by reacting the at least one catechol compound and the at least one co-reactant compound under oxidative conditions.

9. The method of claim 1, wherein the at least one preformed reaction product is obtained by reacting the at least one catechol compound with the at least one co-reactant compound in an aqueous reactant mixture at a temperature of from 10 to 100° C. for a time of from 1 to 20 hours in the presence of molecular oxygen.

10. The method of claim 1, wherein the at least one preformed reaction product is present in the aqueous mixture at a concentration of from 5 to 500 ppm.

11. The method of claim 1, wherein contacting the conversion-coated metal substrate with the aqueous mixture is carried out for a time of from 10 seconds to 10 minutes at a temperature of 10 to 54° C.

12. The method of claim 1, wherein the aqueous mixture, when contacted with the surface of the conversion-coated metal substrate, has a pH of from 8.5 to 11.

13. The method of claim 1, additionally comprising applying at least one paint layer to the sealed conversion-coated metal substrate.

14. The method of claim 13, wherein applying at least one paint layer comprises electrophoretic coating.

15. The method of claim 1, wherein the metal substrate having a conversion coating layer thereon has been conversion-coated by zinc phosphating or by deposition of a Group IV metal oxide.

16. An article comprising a metal substrate, a conversion coating layer on at least one surface of the metal substrate, and a seal layer prepared by the method of claim 1, wherein the catechol is dopamine and the polyethyleneimine comprises a plurality of primary amino and secondary amino groups and has a number average molecular weight of 800 up to 2,000,000, deposited on the conversion coating layer.

17. The article of claim 16, additionally comprising at least one paint layer on the seal layer.

18. The method of claim 1, wherein the at least one co-reactant compound further comprises methacrylamidoethyl ethylene urea.

19. The method of claim 1, wherein the pre-formed reaction product comprises 5 to 20% by weight of the at least one catechol compound, based on the total weight of the at least one catechol compound and the at least one co-reactant compound.

20. The method of claim 19, wherein the pre-formed reaction product comprises 5 to 15% by weight of the at least one catechol compound, based on the total weight of the at least one catechol compound and the at least one co-reactant compound.

\* \* \* \* \*